(12) United States Patent  
Chang et al.

(10) Patent No.: US 9,465,205 B2  
(45) Date of Patent: Oct. 11, 2016

(54) OPTICAL LENS AND BACKLIGHT MODULE INCORPORATING THE SAME

(71) Applicant: ADVANCED OPTOELECTRONIC TECHNOLOGY, INC., Hsinchu Hsien (TW)

(72) Inventors: Chao-Hsiung Chang, Hsinchu (TW); Pin-Chuan Chen, Hsinchu (TW); Lung-Hsin Chen, Hsinchu (TW); Wen-Liang Tseng, Hsinchu (TW)

(73) Assignee: ADVANCED OPTOELECTRONIC TECHNOLOGY, INC., Hsinchu Hsien (TW)

( * ) Notice: Subject to any disclaimer, the term of this patent is extended or adjusted under 35 U.S.C. 154(b) by 98 days.

(21) Appl. No.: 14/445,486

(22) Filed: Jul. 29, 2014

(65) Prior Publication Data

US 2015/0036321 A1 Feb. 5, 2015

(30) Foreign Application Priority Data

Jul. 30, 2013 (CN) .......................... 2013 1 03244959

(51) Int. Cl.
*F21V 5/04* (2006.01)
*F21V 13/14* (2006.01)
*G02B 19/00* (2006.01)
*F21V 7/00* (2006.01)
*F21V 9/16* (2006.01)

(52) U.S. Cl.
CPC ........... *G02B 19/0061* (2013.01); *F21V 5/046* (2013.01); *F21V 7/0091* (2013.01); *G02B 19/0028* (2013.01); *F21V 9/16* (2013.01)

(58) Field of Classification Search
CPC ...... G02B 3/00; G02B 3/06; G02B 19/0028; G02B 19/0061; F21V 5/046; F21V 7/0091; F21V 9/16
See application file for complete search history.

(56) References Cited

U.S. PATENT DOCUMENTS 7,347,590 B2 *  3/2008 Lee ................... G02B 19/0071
                                              362/327
7,445,359 B2 * 11/2008 Chang ................... F21V 5/046
                                              359/664

(Continued)

FOREIGN PATENT DOCUMENTS

CN   102168838 A   8/2011
CN   202733781 U   2/2013
CN   202927738 U   5/2013

*Primary Examiner* — Alan Cariaso
(74) *Attorney, Agent, or Firm* — Zhigang Ma

(57) ABSTRACT

An optical lens includes a first optical surface located at a bottom thereof, a third optical surface located at a top thereof and arranged oppositely to the first optical surface, and a second optical surface extending between the first optical surface and the third optical surface. The third optical surface is recessed downwardly towards the first optical surface. The light from the LED light source enters into the optical lens through the first optical surface, most of the entering light is directly refracted out of the optical lens through the second optical surface, and a part of the entering light that strikes the third optical surface is first reflected by the third optical surface towards the second optical surface via total internal reflection and then refracted out of the optical lens through the second optical surface. A backlight module incorporating the optical lens is also provided.

10 Claims, 3 Drawing Sheets

(56) References Cited

U.S. PATENT DOCUMENTS

| | | | | |
|---|---|---|---|---|
| 7,549,781 B2* | 6/2009 | Kim | ............ | G02B 19/0066 362/311.01 |
| 7,703,950 B2* | 4/2010 | Ewert | ............ | B29C 45/0025 362/311.02 |
| 8,142,056 B2* | 3/2012 | Li | ............ | F21V 7/0091 362/308 |
| 8,382,337 B2* | 2/2013 | Ing | ............ | B29D 11/00798 313/361.1 |
| 8,425,076 B2* | 4/2013 | Lockwood | ............ | B64F 1/20 362/153.1 |
| 8,541,795 B2* | 9/2013 | Keller | ............ | G02B 6/4214 257/100 |
| 8,696,175 B2* | 4/2014 | Yoon | ............ | F21V 5/04 362/317 |
| 9,086,517 B2* | 7/2015 | Fukuda | ............ | G02B 3/0056 |
| 2009/0109678 A1* | 4/2009 | Hsu | ............ | F21K 9/00 362/260 |
| 2015/0009680 A1* | 1/2015 | Chang | ............ | G02B 19/0028 362/308 |

* cited by examiner

OPTICAL LENS AND BACKLIGHT MODULE INCORPORATING THE SAME

FIELD

The present disclosure relates generally to an optical lens and a backlight module incorporating the optical lens.

BACKGROUND

Light emitting diodes (LEDs) are solid state light emitting devices formed from semiconductors, which are more stable and reliable than other conventional light sources such as incandescent bulbs. Thus, LEDs are being widely used in various fields such as numeral/character display elements, signal lights, light sources for lighting, and display devices.

Nowadays, LED light sources are widely applied for illumination, such as in a direct-type backlight module assembly. The direct-type backlight module assembly includes an LED light source and a lens coupled to the LED light source to spread light emitted from the LED light source into a wide angular range.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Figure 1:
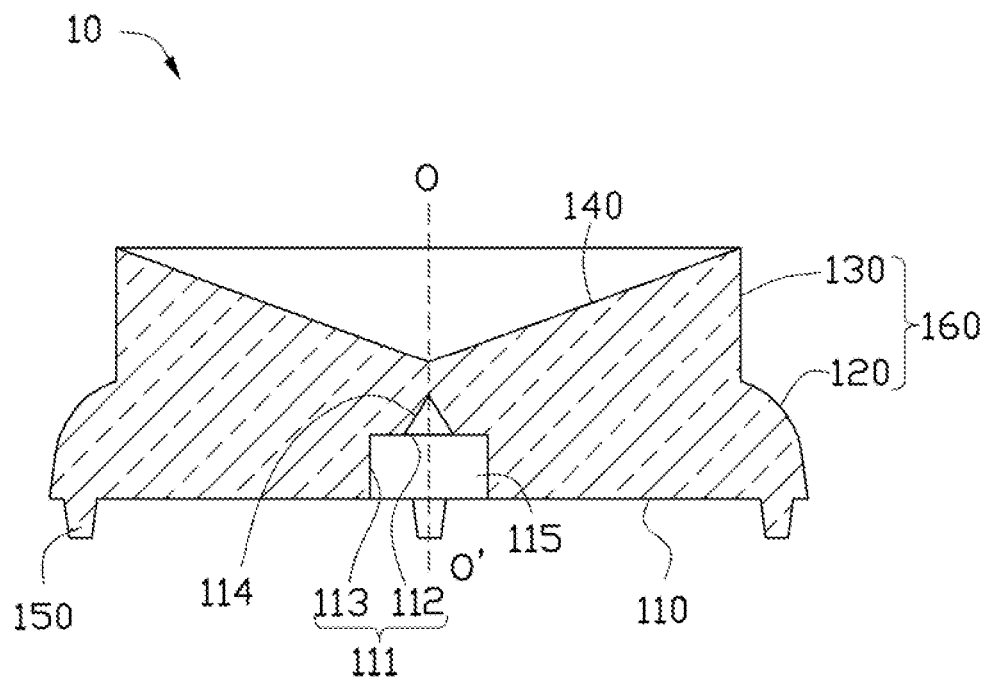
FIG. 1 is an illustrative, cross-sectional view of an optical lens in accordance with an exemplary embodiment of the present disclosure.
Figure 2:
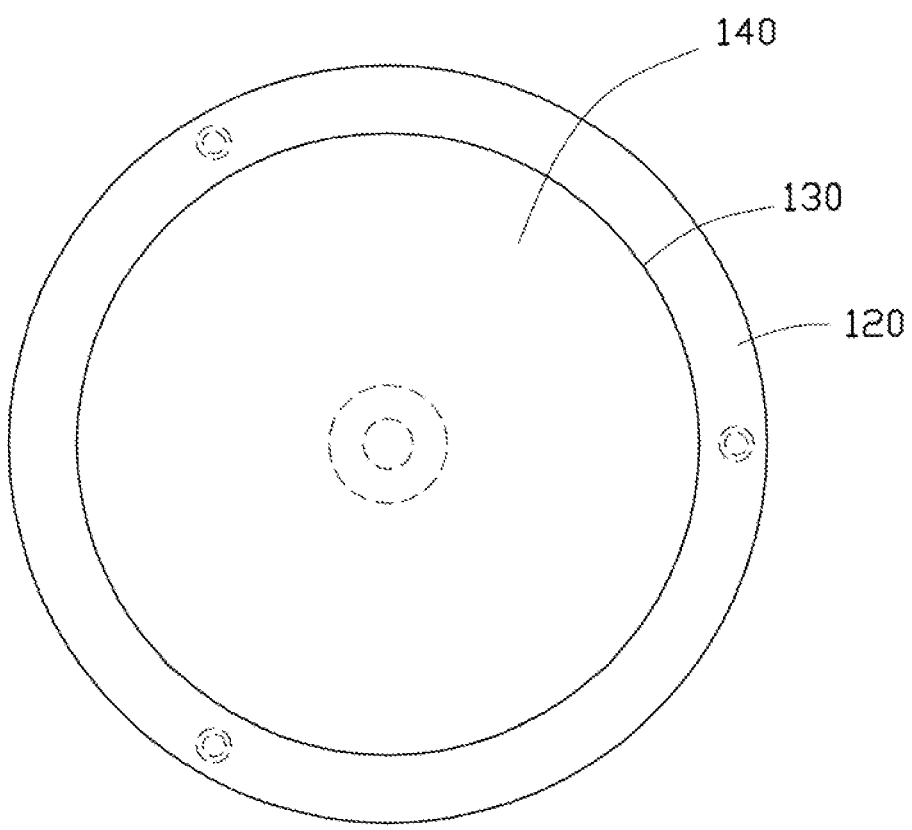
FIG. 2 is similar to FIG. 1, but viewed from a top aspect.

Referring to FIGS. 1 and 2, an optical lens 10 in accordance with an exemplary embodiment of the present disclosure includes a bottom surface 110, a third optical surface 140 arranged oppositely to the bottom surface 110, and a second optical surface 160 located at a lateral side thereof for interconnecting the bottom surface 110 and the third optical surface 140. The third optical surface 140 is recessed downwardly towards the bottom surface 110 and surrounded by the second optical surface 160. The optical lens 10 is made of a light transmissive material selected from, but not limited to, the group consisting of polycarbonate, polymethylmethacrylate (PMMA) or glass. The optical lens 10 is symmetrical with respect to an optical axis OO' at a center thereof.

A first optical surface 111 is recessed upwardly from a central portion of the bottom surface 110 towards the third optical surface 140. The first optical surface 111 includes a top wall 112, and a lateral side wall 113 extending downwardly from the top wall 112 and interconnecting the top wall 112 and the bottom surface 110. The lateral side wall 113 of the first optical surface 111 is cylindrical and perpendicular to the bottom surface 110, and the top wall 112 of the first optical surface 111 is spaced from and parallel with the bottom surface 110. The top wall 112 and the lateral side wall 113 cooperatively form a receiving cavity 115 for accommodating a light source therein.

A light spreading surface 114 is further recessed upwardly from the top wall 112 towards the third optical surface 140. The light spreading surface 114 is a conical surface having a gradually reduced inner diameter towards the third optical surface 140.

The second optical surface 160 includes a first light exit surface 120 extending from an outer periphery of the bottom surface 110, and a second light exit surface 130 interconnecting the first light exit surface 120 and the third optical surface 140. The second light exit surface 130 is a cylindrical surface perpendicular with the bottom surface 110, and the first light exit surface 120 is a convex curved surface having a radius slightly larger than that of the second light exit surface 130. Alternatively, the second light exit surface 130 can be a curved surface having a different radius of curvature from that of the first light exit surface 120.

An apex of the light spreading surface 114 is positioned at the optical axis OO' of the optical lens 10. The apex of the light spreading surface 114 is lower than an intersection of the second light exit surface 130 and the first light exit surface 120.

The third optical surface 140 is an inverted conical surface having a gradually reduced inner diameter towards the first optical surface 111. A bottom of the third optical surface 140 is positioned at the optical axis OO' and higher than an intersection of the second light exit surface 130 and the first light exit surface 120. In the present embodiment, an apex angle of the third optical surface 140 is less than 120 degrees.

The optical lens 10 further includes a plurality of fixing pins 150 extending downwardly from the bottom surface 110 for firmly fixing the optical lens 10 onto a target object such as an external PCB board (not shown). The fixing pins 150 are placed at approximately equal intervals around an outer periphery of the bottom surface 110.

Figure 3:
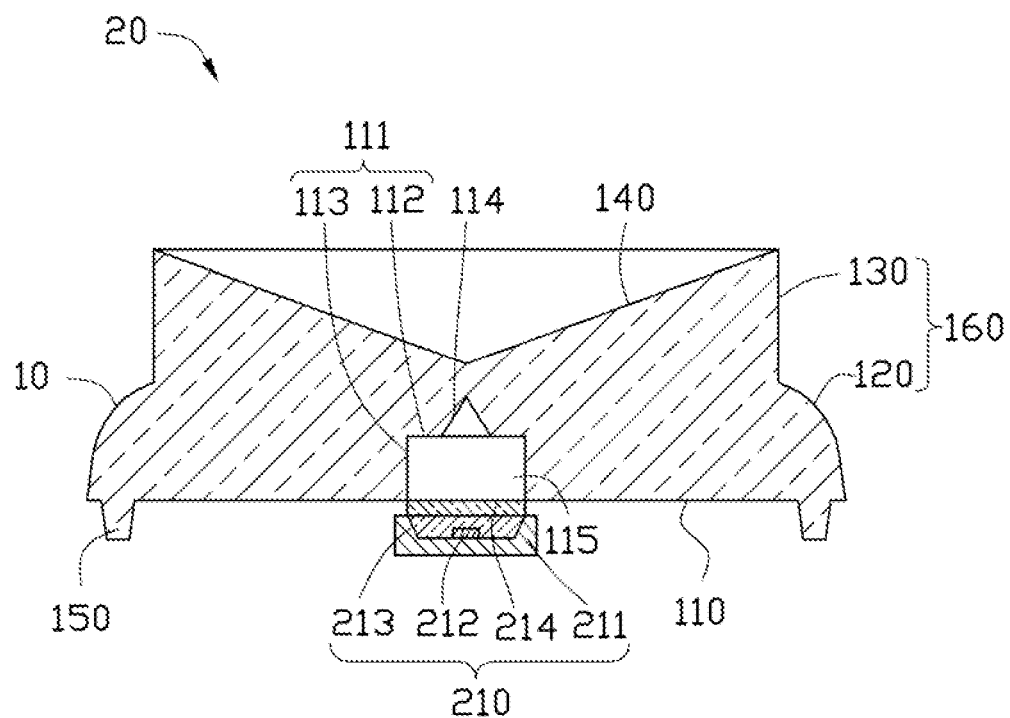
FIG. 3 is a backlight module incorporating the optical lens of FIG. 1 in accordance with an exemplary embodiment of the present disclosure.

Referring to FIG. 3, a backlight module 20 incorporating the optical lens 10 of FIG. 1 is shown. The backlight module 20 includes an LED light source 210 and the optical lens 10 optically coupled to the LED light source 210. The optical lens 10 is configured for diverging light emitted from the LED light source 210 towards a periphery thereof. The LED light source 210 has an optical axis thereof coaxially with the optical axis OO' of the optical lens 10.

The LED light source 210 includes a substrate 211, an LED chip 212 mounted on the substrate 211, and an encapsulating layer 214 located above the LED chip 212. The substrate 211 defines a recess 213 in a top side thereof. An inner diameter of the recess 213 gradually decreases from the top to the bottom thereof. The LED chip 212 is disposed at the bottom of the recess 213. A large opening of the recess 213 corresponds to an opening of the receiving cavity 115. The encapsulating layer 214 is sandwiched between the top side of the substrate 211 and the bottom surface 110 of the optical lens 10. The encapsulating layer 214 is shaped for matching with the opening of the recess 213 and completely covers the opening of the recess 213. In the present embodiment, the encapsulating layer 214 contains phosphor particles doped therein to convert a wavelength of the light emitted from the LED chip 212.

When a forward bias is applied to the LED chip 212, light emitted from the LED chip 212 is reflected by an inclined inner surface of the recess 213 towards the encapsulating layer 214, and then the light travels through the encapsulating layer 214 to reach the first optical surface 111. The light emitted from the LED light source 210 enters into the optical lens 10 through the first optical surface 111, most of the entering light is directly refracted out of the optical lens 10 through the first and second light exit surfaces 120, 130 of the second optical surface 160, a part of the entering light that strikes the third optical surface 140 is first reflected by the third optical surface 140 towards the first and second light exit surfaces 120, 130 of the second optical surface 160 via total internal reflection (TIR) and then refracted out of the optical lens 10 through the first and second light exit surfaces 120, 130 of the second optical surface 160, and a part of the entering light that strikes the third optical surface 140 is directly refracted out of the optical lens 10 through the third optical surface 140. Alternatively, all of the entering light that strikes the third optical surface 140 is first reflected by the third optical surface 140 towards the first and second light exit surfaces 120, 130 of the second optical surface 160 via total internal reflection (TIR) and then refracted out of the optical lens 10 through the first and second light exit surfaces 120, 130 of the second optical surface 160.

As at least a part of the light emitted from the LED light source 210 with a small irradiation angle is diverged by the third optical surface 140 towards the second optical surface 160 and refracted out of the optical lens 10, and a large lateral peripheral area of the optical lens 10 is irradiated. Furthermore, the light with a small irradiation angle near the optical axis OO' are refracted at a large angle by the light spreading surface 114 towards a lateral periphery of the optical lens 10 away from the optical axis OO'. Accordingly, the backlight module 20 having a wide illumination field is obtained.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments.

What is claimed is:

1. A backlight module comprising:
an LED light source; and
an optical lens optically coupled to the LED light source for diverging light emitted therefrom, the optical lens comprising a first optical surface located at a bottom thereof, a third optical surface located at a top thereof and arranged oppositely to the first optical surface, and a second optical surface located at a lateral side thereof and extending between the first optical surface and the third optical surface;
wherein the third optical surface is recessed downwardly towards the first optical surface and surrounded by the second optical surface;
wherein the light emitted from the LED light source enters into the optical lens through the first optical surface, most of the entering light is directly refracted out of the optical lens through the second optical surface and at least a part of the entering light that strikes the third optical surface is first reflected by the third optical surface towards the second optical surface via total internal reflection and then refracted out of the optical lens through the second optical surface; and
wherein the first optical surface comprises a top wall and a cylindrical inner wall extending downwardly from the top wall, and the top wall and the cylindrical inner wall cooperatively form a receiving cavity for accommodating the LED light source, the LED light source is arranged under the receiving cavity and a top of the LED light source covers an opening of the receiving cavity.

2. The backlight module of claim 1, wherein the second optical surface comprises a first light exit surface and a second light exit surface connected to the first light exit surface, the second light exit surface is a cylindrical surface, and the first light exit surface is a convex curved surface having a radius slightly larger than that of the second light exit surface.

3. The backlight module of claim 1, wherein the LED light source comprises a substrate and a LED chip, the substrate defines a recess in a top side thereof corresponding to the receiving cavity for receiving the LED chip therein, and an inner diameter of the recess gradually decreases from the top to the bottom thereof.

4. The backlight module of claim 3, wherein the LED light source further comprises an encapsulating layer spaced from the LED chip and covering an opening of the recess, and the encapsulating layer has phosphor particles doped therein to convert a wavelength of the light from the LED chip.

5. The backlight module of claim 2, wherein a light spreading surface is recessed upwardly from the top wall of the first optical surface towards the third optical surface, and the light spreading surface is a conical surface having a gradually reduced inner diameter towards the third optical surface.

6. The backlight module of claim 5, wherein an apex of the light spreading surface is lower than an intersection of the second light exit surface and the first light exit surface.

7. The backlight module of claim 2, wherein the optical lens further comprises a bottom surface interconnecting the first optical surface and the first light exit surface of the second optical surface, wherein the receiving cavity is recessed upwardly from a central portion of the bottom surface towards the third optical surface.

8. The backlight module of claim 2, wherein the third optical surface is an inverted conical surface having a gradually reduced inner diameter towards the first optical surface.

9. The backlight module of claim 8, wherein a bottom of the third optical surface is higher than an intersection of the second light exit surface and the first light exit surface.

10. The backlight module of claim 7, wherein the optical lens further comprises a plurality of fixing pins extending downwardly from the bottom surface for firmly fixing the optical lens onto a target object, the fixing pins being placed at approximately equal intervals around an outer periphery of the bottom surface.

* * * * *